April 12, 1966 T. W. RITCHEY, JR 3,246,080

CLAMPING CIRCUIT

Filed Oct. 18, 1963 2 Sheets-Sheet 1

INVENTOR.
THOMAS W. RITCHEY, JR.
BY John V. Regan
Attorney

April 12, 1966

T. W. RITCHEY, JR 3,246,080

CLAMPING CIRCUIT

Filed Oct. 18, 1963

2 Sheets-Sheet 2

INVENTOR.
THOMAS W. RITCHEY, JR.
BY John V. Regan
Attorney

United States Patent Office 3,246,080
Patented Apr. 12, 1966

3,246,080
CLAMPING CIRCUIT

Thomas W. Ritchey, Jr., Cherry Hill, N.J., assignor to Radio Corporation of America, a corporation of Delaware Filed Oct. 18, 1963, Ser. No. 317,281
6 Claims. (Cl. 178—7.2)

This invention relates to clamping circuits, and more particularly to bidirectional, synchronous clamping circuits.

In certain systems using video scanning techniques, such as optical character reading systems and television systems, the video signals generated during scanning initially include a D.C. component which is thereafter removed from the signal by the A.C. amplification and coupling networks in the systems. It is desirable or necessary to reinsert the D.C. component in order to obtain a reference level. The D.C. component is reinserted into the video signals by clamping the video signals to a predetermined clamping or reference level during the times that the periodic blanking pulses occur in the video signals. Furthermore, as will be described in more detail subsequently, in optical character reading systems, it is also desirable to clamp the video signals at different clamping levels, depending on the signal strength of the generated video signals.

Accordingly, it is an object of this invention to provide a new and improved bidirectional synchronous clamping circuit.

It is another object of this invention to provide an improved bidirectional synchronous clamping circuit which clamps video signals at different levels as a function of their signal strength.

A clamping circuit, in accordance with the invention, includes a pair of transistors of opposite conductivity types. The emitter-to-collector current paths of each transistor are serially connected together and the junction of the transistors defines an output terminal for the clamping circuit. A pair of diodes, poled in the same direction, are serially connected between the base electrodes of the transistors. The junction of the diodes defines a reference or clamping potential terminal for the clamping circuit. The diodes and the base-emitter junctions of the transistors effectively provide a bridge network. A reference potential is applied to the reference potential terminal. Both the diodes and transistors are biased to be normally nonconductive so as to isolate the reference potential terminal from the output terminal. Clamping pulses, synchronized to the occurrence of the blanking pulses in the video signals, are applied to forward bias both the diodes and transistors into conduction. The diode-transistor bridge network is thereby balanced and the reference potential is transferred to the output terminal of the clamping circuit.

The clamping circuit is connected between a source of video signals and a video signal processing circuit which may be A.C. coupled, such as by a capacitor, to the video signal source. The clamping circuit operates to clamp the video signal to the applied reference potential level.

In accordance with a feature of the invention, which is particularly applicable to optical character reading systems, the reference or clamping potential applied to the clamping circuit may be made to vary as a function of signal strength from scan to scan.

Figure 1:
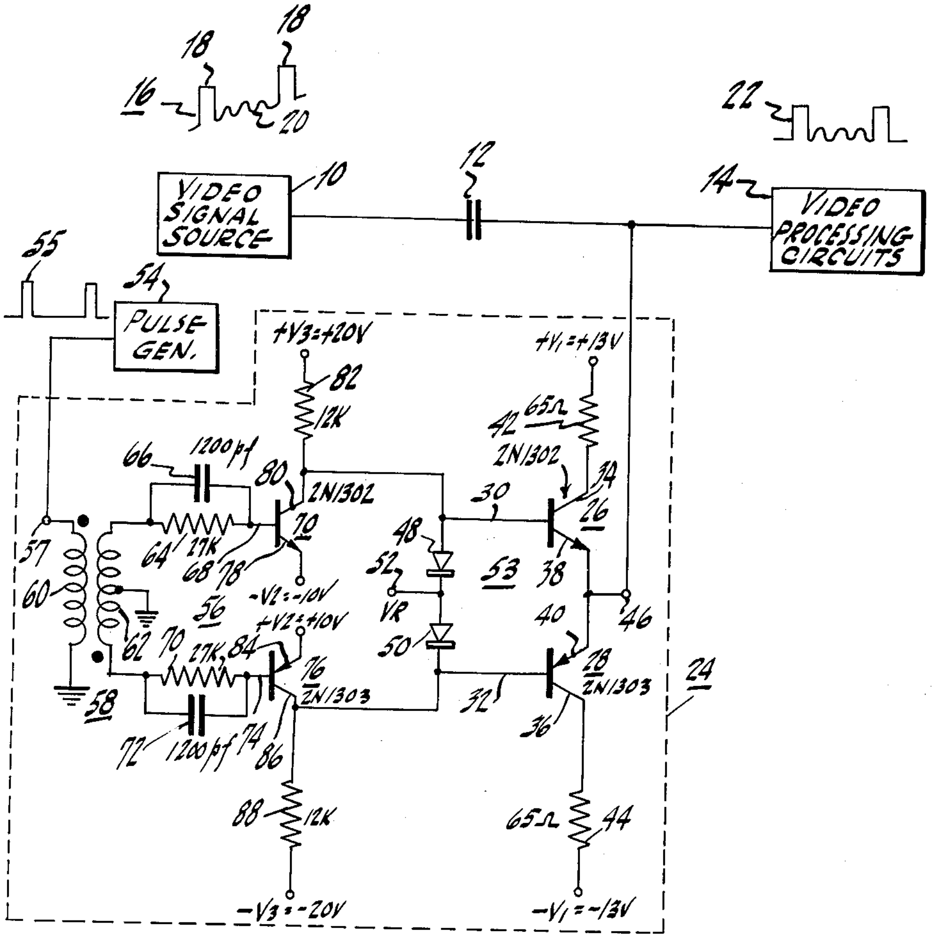
FIGURE 1 is a schematic circuit diagram of a clamping circuit in accordance with the invention.

Referring now to FIGURE 1, a source of video signals 10 is A.C. coupled such as by means of a capacitor 12 to a video processing circuit 14. The video signals 16 derived from the video signal source 10 includes a plurality of blanking pulses 18 periodically occurring in the video signals 16. The portions 20 of the video signals 16 between the blanking pulses 18 comprise the character image signals of the characters or symbols being read in an optical character reading system. The video signal 16 is shown in FIGURE 1 as increasing in amplitude along a curved path, which graphically represents the R-C charge path of the capacitor 12 and the resistance R exhibited by the circuits coupled thereto. This increase in amplitude or tilt (which is exaggerated in FIGURE 1) is undesirable in many television applications and impermissible in certain optical character reading applications. A clamping circuit 24 is utilized to clamp the blanking pulses 18 in the video signals 16 to a desired level so that each scan line (i.e., one character image signal 20 plus one blanking pulse 18) falls along a uniform reference line. Such a clamped signal is shown by the curve 22.

The clamping circuit 24 includes a pair of transistors 26 and 28 of opposite conductivity types. The transistor 26 may, for example, comprise an NPN type whereas the transistor 28 may comprise a PNP type. The transistors 26 and 28 include, respectively, input or base electrodes 30 and 32, common or collector electodes 34 and 36, and output or emitter electrodes 38 and 40. The collector electrodes 34 and 36 are coupled, respectively, through resistors 42 and 44 to a source of positive potential $+V_1$ and a source of negative potential $-V_1$. The emitter electrodes 38 and 40 are directly connected together to connect the emitter-to-collector current paths of the transistors 26 and 28 serially between the sources of potential $+V_1$ and $-V_1$. The junction of the serially connected transistors 26 and 28 defines an output terminal 46 for the clamping circuit 24. A pair of diodes 48 and 50 are poled in the same direction and serially connected anode-to-cathode between the base electrodes 30 and 32 of the transistors 26 and 28. The junction of the diodes 48 and 50 defines a reference potential or clamping terminal 52 for the clamping circuit 24. The diodes 48 and 50 and the base-emitter junctions of the transistors 26 and 28 comprise a bridge network 53, with the terminals 46 and 52 defining two of the diagonal (conjugate) bridge terminals or nodes thereof and the base electrodes 30 and 32 defining the other two diagonal bridge terminals thereof. A source of reference potential $V_R$ (not shown) is connected to the reference potential terminal 52.

Clamping or "keying" pulses 55 from a pulse generator 54 are applied to the diode-transistor bridge 53 by means of a phase splitting and driver circuit 56. The clamping pulses 55 are synchronized to occur during the latter portion ("backporch" in television signals) of the blanking pulses 18 where the blanking pulse level is substantially uniform. The pulses 55 are applied to a phase splitting transformer 58 which includes a primary winding 60 and a center-tapped secondary winding 62. The pulse generator 54 is coupled to one terminal 57 of the primary 60, while the other terminal thereof is connected to a point of common reference potential or ground in the circuit. The center-tap of the secondary winding 62 is also grounded. The primary 60 and secondary 62 windings of the transformer 58 are wound in the sense denoted by the dots in FIGURE 1. One terminal of the secondary 62 is coupled through a parallel resistor 64-capacitor 66 combination to the base electrode 68 of a transistor 70, whereas the other terminal of the secondary 62 is coupled through a parallel resistor 70-capacitor 72 combination to the base electrode 74 of a transistor 76. The transistor 70, which may be an NPN type, also includes an emitter electrode 78 coupled to a source of negative potential $-V_2$ and a collector electrode 80 coupled through a resistor 82 to a source of positive potential $+V_3$. The transistor 76, which may be a PNP type, also includes an emitter electrode 84 coupled to a source of positive potential $+V_2$ and a collector electrode 86 coupled through a resistor 88 to a source of negative potential $-V_3$. In the absence of the clamping pulses 55, the transistors 70 and 76 are normally biased to conduct in the saturation region thereof which reverse biases the transistors 26 and 28 and the diodes 48 and 50 to keep them cut-off. Thus, the reference potential terminal 52 is normally isolated from the output terminal 46 of the clamping circuit 24.

In operation, the clamping circuit 24 clamps the generated video signals 16 to a desired reference potential level when keyed into operation by the clamping pulses 55. Between individual clamping pulses 55, the transistors 70 and 76 are biased to saturation. The bias potentials $+V_2$ and $-V_2$ are selected to be equal to each other in magnitude and to be greater in absolute magnitude than the reference potential $V_R$ or the potential at the output terminal 46. The potential ($-V_2$) of the emitter 78 of the saturated transistor 70 also appears substantially at the collector 80 thereof and reverse biases both the diode 48 and the base-emitter junction of the transistor 26. Similarly, the positive potential ($+V_2$) of the emitter 84 of the saturated transistor 76 also appears substantially at the collector 86 thereof and reverse biases both the diode 50 and the base-emitter junction of the transistor 28. Thus, the diode-transistor bridge network 53 presents a substantially large impedance at the output terminal 46 of the clamping circuit 24.

Upon the application of a clamping pulse 55 to the primary 60 of the transformer 58, a pair of opposite polarity pulses are induced in the secondary winding 62 thereof. The secondary winding 62 is wound in a sense to apply a negative-going pulse to the transistor 70 and a positive-going pulse to the transistor 76. Both of the transistors 70 and 76 are therefore driven to cut-off. The potential at the base electrode 30 of the transistor 26 therefore commences to rise from the $-V_2$ negative potential level to the positive $V_3$ potential level, whereas the base electrode 32 of the transistor 28 commences to drop from the positive potential level $V_2$ to the negative potential level $-V_3$. The clamping pulse 55 is amplified significantly by the transistors 70 and 76.

Assuming that the capacitor 12 has charged in a direction shown by the video signal 16 in FIGURE 1, the potential at the output terminal 46 of the clamping circircuit 24 will be higher or more positive than the reference potential $V_R$. The capacitor 12 must therefore be discharged to the desired clamping potential level. As the potential of the base electrode 32 of the transistor 28 decreases, the base-emitter junction thereof becomes forward biased when the base electrode 32 is more negative than the potential at the output terminal 46. Consequently, the transistor 28 conducts, amplifying the base current by a factor of beta. The diode 48 also forward biases and clamps the base 30 of the transistor 26 to the reference potential $V_R$ level. The transistor 26 therefore remains cut-off because the emitter 38 is at a higher potential than the reference potential $V_R$. The surge of current flowing into the output terminal 46 due to the conduction of the transistor 28 tends to discharge the capacitor 12, since the potentials at both the emitter 40 and the output terminal 46 tracks the decreasing base electrode 32 potential. When the base electrode 32 potential is slightly less than the reference potential $V_R$ of the terminal 52, the diode 48 forward biases and clamps the base electrode 32 to substantially the reference potential $V_R$ level. The emitter 40 and the output terminal 46 also hold at the reference potential level $V_R$. The base-emitter junction of the transistor 26 also forward biases and this transistor conducts.

Excess current conduction from the biasing sources flow through the bridge network 53 in two parallel conduction paths, one being the serially connected diode path and the other being the serially connected transistor path. Substantially no current flows into or out of the terminals 46 and 52 since the bridge 53 is balanced. The bridge network 53 is balanced because the voltage drops across the two conducting diodes 48, 50 are equal to each other and the voltage drops across the forward biased base-emitter junctions of the transistors 26, 28 are substantially equal to each other. Furthermore, the voltage drop across a forward biased base-emitter junction is also substantially equal to the voltage drop across a forward biased diode. The balanced bridge network 53 maintains the reference potential $V_R$ at the output terminal 46 for the duration of the clamping pulse 55 and forces the amplitude of the blanking pulse 18 to assume this reference level.

The trailing edge of the clamping pulse 55 causes opposite polarity pulses to be induced in the secondary winding 62 to forward bias the base-emitter junctions of the transistors 70 and 76. These transistors turn on and rapidly saturate. The saturation of the transistors 70 and 76 applies reverse biasing voltages to the bridge network 53 to cut-off the diodes 48 and 50 and the transistors 26 and 28. The bridge network 53 therefore exhibits a large impedance between the reference 52 and output 46 terminals. Successive clamping pulses repeat the above-described operation so that the video signals are clamped to a uniform level, as shown by the curve 22 in FIGURE 1.

The complementary transistors 26 and 28 provide bidirectionality in that one transistor is utilized to discharge the capacitor 12 while the other transistor is utilized to charge this capacitor. Thus, regardless of whether the potential of the capacitor 12 is below or above the desired reference potential level, the clamping circuit 24 will return it to this level. It is to be noted that the balanced bridge arrangement in the clamping circuit 24 substantially prevents the clamping pulses from being transferred to the blanking pulses in the video signal 16. Thus, substantially no spurious components are introduced into the video signal. This is particularly important where it is desired, such as in optical character reading systems, to clamp the video signals more than once in the system. It is also to be noted that the leakage currents produced by the transistors 26 and 28, while in cut-off, effectively cancel each other and do not enter into the image signal portion 20 of the video signal 16.

The clamping circuit 24 is not only a fast operating clamping circuit but also is capable of clamping high level video signals. The clamping circuit 24, with the types and values of components shown in FIGURE 1, is capable of providing 200 milliamperes of current at the output terminal 46. Such a large surge of current permits signals of relatively high amplitude to be clamped. Furthermore, such a high surge of current also permits larger valued coupling capacitors 12 to be utilized. Large value capacitors increase the time constant of the coupling circuits and therefore aid in reducing the amount of tilt in the base line of the video signals between blanking pulses.

The clamping circuit 24 may also be utilized to bidirectionally clamp video signals at a variety of clamping levels based on the peak signal strength of the image signals 20. Such an application is important in some optical character reading systems. This is so because it is desirable to digitalize the essentially analog image signal pulses 20 so as to provide squarewave image signal pulses having fast rise and fall times. Such squarewave pulses make accurate identification of the character or symbol being read more reliable. A method of digitalizing the image signals 20 is to quantize these pulses by applying them to a Schmitt trigger circuit. A Schmitt trigger produces uniform amplitude squarewave output pulses for input pulses which exceed the triggering level of the circuit. However, the fixed quantizing level of a Schmitt trigger causes incorrect output signals when the signal strength of the image signals 20 varies appreciably from scanline to scanline, such as shown in FIGURE 3. Such variations, for example, may occur due to varying ink intensities in the symbols or characters. With a fixed quantizing level, low amplitude image signals may not be quantized at all, whereas noise in high level image signals may be quantized along with the image signals themselves. Thus, it is desirable to provide a variable squantizing level based on the signal strength of each scanline of the image signals 20. However, for reliability, it is also desirable that the quantizing level be a fixed fraction of the image signal strength such as, for example, two-thirds. Such a variable level clamping is performed by the clamping circuit 24, as utilized in the circuit of FIGURE 2.

Figure 2:
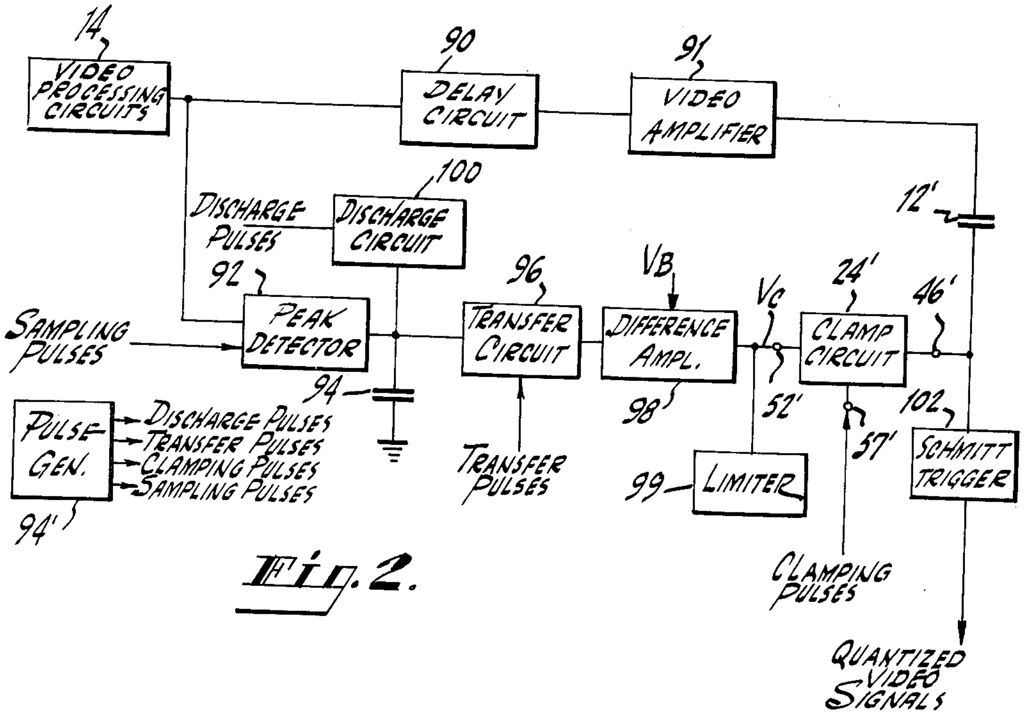
FIGURE 2 is a schematic block diagram of the utilization of the clamping circuit of FIGURE 1 as a variable level clamping circuit.
Figure 3:
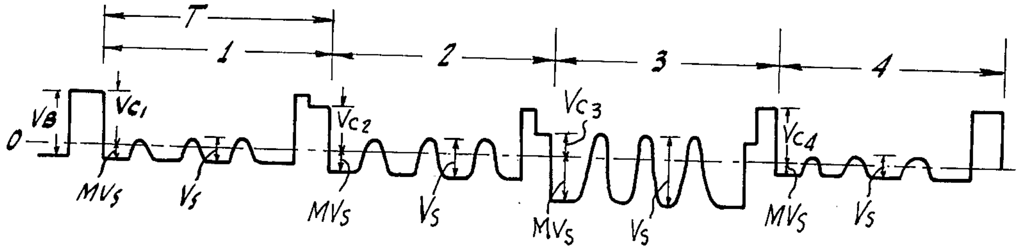
FIGURE 3 is a graph helpful in explaining the operation of the circuit of FIGURE 2.

Referring to FIGURE 2, the video signals from the video processing circuit 14 are applied to a delay circuit 90 which introduces a delay of one scan time (T in FIGURE 3) into the video signals. The delayed video signals from the delay circuit 90 are amplified in a video amplifier 91. The video signals from the video processing circuit 14 are also applied to a peak detector 92 along with sampling pulses from a pulse generator 54'. The sampling pulses gate the peak detector 92 closed during the blanking pulse 18 intervals. Thus, just the image signals 20 are peak detected in the detector 92 and stored on a capacitor 94 in the output circuit of the peak detector 92. At the end of a scanline, a fraction of the peak voltage of the image signals 20 stored on the capacitor 94 is transferred through a transfer circuit 96 to a difference amplifier 98. The transfer circuit 96 is gated to close by transfer pulses applied from the pulse generator 54' applied at the end of a scanline. The fraction of the peak voltage transferred is the same fraction at which the image signal is to be quantized. The capacitor 94 is then discharged by a discharge circuit 100 which is gated by discharge pulses applied from the pulse generator 54'. The discharge circuit 100 removes any voltage on the capacitor 94 and prepares it to receive the peak voltage of the next scanline. The peak image signal voltage is subtracted in the difference amplifier 98 from a reference voltage $V_B$ applied from a source (not shown). The reference voltage $V_B$ may, for example, be equal to the amplitude of the blanking pulses 18 as derived from the amplifier 91. The difference voltage derived from the amplifier 98 is limited by a limiter 99 and applied to a clamping circuit 24'. The circuit 24' may be identical to the clamping circuit 24 in FIGURE 1. The difference voltage comprises a control voltage $V_C$ which varies as an inverse function of the image signal level in each scanline. The control voltage $V_C$ is applied to the reference voltage terminal 52' to provide the clamping reference potential for each scanline. The output terminal 46' of the clamping circuit 24' is connected to the output of the video amplifier 91 through the coupling capacitor 12' and the clamped video signals are applied to a quantizer, such as a Schmitt trigger 102. The Schmitt trigger 102 exhibits a fixed triggering level which may, for example, be adjusted to be zero or ground level.

In operation, the video signals from the processing circuit 14 are delayed for one scanline in the delay circuit 90. During the delay of a particular scanline, a control voltage $V_C$ which is an inverse function of the peak image signal strength of the particular scanline is developed in the difference amplifier 98. The control voltage $V_C$ is applied as the reference potential to the clamping circuit 24' simultaneously with the arrival of the blanking pulse 18 preceding the particular scanline. The control voltage $V_C$ developed in the difference amplifier 98 causes the particular delayed video signal scanline to be quantized by the Schmitt trigger 102 at a fixed fraction of its peak image signal strength in accordance with the equation, $$V_C = V_B - MV_S \qquad (1)$$

wherein $V_B$=the amplitude of the blanking pulse 18 as derived from the amplifier 91,
$M$=the fraction at which it is desired to quantize the image signals,
$V_S$=the peak level of the image signals, and $V_C$=the control voltage that is derived from the difference amplifier 98.

Thus, it can be seen from FIGURE 3 that when the peak signal strength $V_S$ is low, as in scanline 1, the control voltage $V_{C_1}$ is relatively large. When the peak signal strength $V_S$ increases, as in scanlines 2 and 3, the control voltages $V_{C_2}$ and $V_{C_3}$ decreases proportionately. However, each control voltage causes each scanline to be quantized at a fixed fraction M of its peak image signal strength.

The bidirectionality of the clamping circuit 24' is shown by the differences in clamping between the scanlines 3 and 4 in FIGURE 3. In scanline 3, the peak amplitude of the blanking pulse is initially higher or more positive than the clamping reference potential $V_{C_3}$ for this scanline. In scanline 4, the peak amplitude of the blanking pulse is initially lower or more negative than the clamping reference potential $V_{C_4}$ for this scanline. However, both scanlines are clamped by the clamping circuit 24'. The clamping action occurs during the latter portion of the blanking pulses which causes the amplitude of the blanking pulses in FIGURE 3 to be non-uniform. The limiter 99 in FIGURE 2 limits the maximum amplitude of the control voltage $V_C$ to a predetermined level. Thus, if the image signal strength is low, the quantizing level of the Schmitt trigger 102 (the reference line 0 in FIGURE 3) does not come too close to white level (the base of the blanking pulses) where noise could fire the Schmitt trigger 102.

Thus, a bidirecional clamping circuit has been described which provides fast clamping action at relatively high signal levels. The clamp may be utilized as a variable clamp to clamp video signals at various levels which are a function of the signal strength of the video signals.

What is claimed is:

1. In a system for processing video signals, said video signals comprising successive scanlines of image signals separated by blanking pulses, the combination of,
means for deriving a control voltage which is a function of the peak signal strength of said image signals,
a diode-transistor bridge network coupled to clamp said video signals, and
means for applying said control voltage to said bridge network to clamp said video signals at said control voltage level.

2. A clamping circuit comprising, in combination,
a pair of transistors of opposite conductivity types with each having input, output and common electrodes,
means for serially connecting together the common-to-output electrode current paths of said transistors with the junction of said transistors defining an output terminal for said clamping circuit,
a pair of diodes, poled in the same direction, and serially connected between the input electrodes of said transistors to provide with said transistors a bridge network,
means for applying a reference potential to the junction of said diodes,
means for biasing said transistors and said diodes to be normally nonconductive, and
means for applying pulses to the input electrodes of said transistors to forward bias said diodes and said transistors into conduction so as to transfer said reference potential to the output terminal of said clamping circuit.

3. A clamping circuit comprising, in combination, a pair of diodes and a pair of transistors interconnected to form a bridge network having four bridge terminals, means for applying reverse biasing potentials across first and second diagonally opposite bridge terminals of said bridge network to cut-off said pair of diodes and said pair of transistors, means for applying a clamping reference potential to a third bridge terminal of said bridge network, and means for applying pulses to said first and second bridge terminals to forward bias said pair of diodes and said pair of transistors into conduction so as to transfer said clamping reference potential to a fourth bridge terminal diagonally opposite said third bridge terminal in said bridge network.

4. A clamping circuit comprising, in combination, a pair of transistors of opposite conductivity types with each having base, emitter and collector electrodes, means for serially connecting together the emitter-to-collector current paths of said transistors with the junction of said transistors defining an output terminal for said clamping circuit, a pair of diodes, poled in the same direction, and serially connected between the base electrodes of said transistors so as to provide with said transistors a bridge network, means for applying a clamping reference potential to the junction of said diodes, means for biasing said transistors and said diodes to be normally nonconductive to isolate said clamping reference potential from said output terminal, and means for applying pulses of opposite polarity to the base electrodes of said transistors to forward bias said diodes and said transistors into conduction so as to transfer said clamping reference potential to the output terminal of said clamping circuit during the period of said pulses.

5. A clamping circuit for clamping video signals, said video signals including image signals separated by blanking pulses, comprising, in combination, a pair of diodes and a pair of transistors interconnected to form a bridge network having four bridge terminals, means for applying reverse biasing potentials across first and second diagonally opposite bridge terminals of said bridge network to cut-off said pair of diodes and said pair of transistors, means for deriving a control voltage which is a function of the peak signal strength of said image signals, means for applying said control voltage to a third bridge terminal of said bridge network to comprise a clamping potential for said clamping circuit, and means for applying pulses to said first and second bridge terminals to forward bias said pair of diodes and said pair of transistors into conduction so as to transfer said control voltage to a fourth bridge terminal diagonally opposite said third bridge terminal in said bridge network.

6. A clamping circuit for clamping video signals, said video signals including image signals separated by blanking pulses, comprising, in combination, a pair of transistors of opposite conductivity types with each having base, emitter and collector electrodes, means for serially connecting together the emitter-to-collector current paths of said transistors with the junction of said transistors defining an output terminal for said clamping circuit, a pair of diodes, poled in the same direction, and serially connected between the base electrodes of said transistors so as to provide with said transistors a bridge network, means for deriving a control voltage which is a function of the peak signal strength of said image signals, means for applying said control voltage to the junction of said diodes to comprise a clamping potential for said clamping circuit, means for biasing said transistors and said diodes to be normally nonconductive, and means for applying pulses of opposite polarity and synchronized with said blanking pulses to the base electrodes of said transistors to forward bias said diodes and said transistors into conduction so as to transfer said control voltage to the output terminal of said clamping circuit.

No references cited.

DAVID G. REDINBAUGH, *Primary Examiner.*